United States Patent
Zhang et al.

(10) Patent No.: US 11,382,120 B2
(45) Date of Patent: Jul. 5, 2022

(54) INFORMATION TRANSMISSION METHOD AND DEVICE

(71) Applicant: Huawei Technologies Co., Ltd., Shenzhen (CN)

(72) Inventors: Jinfang Zhang, Shenzhen (CN); Lei Lu, Shanghai (CN); Lu Rong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 16/732,738

(22) Filed: Jan. 2, 2020

(65) Prior Publication Data

US 2020/0146038 A1 May 7, 2020

Related U.S. Application Data

(63) Continuation of application No. PCT/CN2018/095781, filed on Jul. 16, 2018.

(30) Foreign Application Priority Data

Jul. 18, 2017 (CN) .......................... 201710587801.6

(51) Int. Cl.
*H04W 72/12* (2009.01)
*H04L 5/00* (2006.01)
*H04W 72/04* (2009.01)

(52) U.S. Cl.
CPC ....... *H04W 72/1278* (2013.01); *H04L 5/0094* (2013.01); *H04W 72/042* (2013.01); *H04W 72/0413* (2013.01); *H04W 72/1205* (2013.01)

(58) Field of Classification Search
CPC ... H04L 5/0007; H04L 5/0048; H04L 5/0092; H04W 72/042; H04W 72/044
See application file for complete search history.

(56) References Cited

U.S. PATENT DOCUMENTS 9,119,191 B2 * 8/2015 Bi .......................... H04L 1/1854
9,179,445 B2 * 11/2015 Wang .................... H04W 72/04
(Continued)

FOREIGN PATENT DOCUMENTS

| CN | 104137441 A | 11/2014 |
|---|---|---|
| CN | 106716908 A | 5/2017 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 14), 3GPP TS 36.213 V14.3.0 (Jun. 2017), 460 pages.
(Continued)

*Primary Examiner* — Eric Nowlin
(74) *Attorney, Agent, or Firm* — Slater Matsil, LLP

(57) ABSTRACT

This application provides an information transmission method and device. The method includes: determining, by a terminal device when an uplink-downlink configuration between the terminal device and a network device is a first uplink-downlink configuration, a first resource used to transmit first information; receiving, by the terminal device, indication information from the network device, where the indication information is used to indicate that the uplink-downlink configuration is a second uplink-downlink configuration; determining, by the terminal device based on the indication information, a second resource used to transmit the first information; and transmitting, by the terminal device, the first information with the network device on the second resource.

12 Claims, 7 Drawing Sheets

(56) References Cited

U.S. PATENT DOCUMENTS

| | | | | |
|---|---|---|---|---|
| 9,191,930 B2* | 11/2015 | Papasakellariou | .... | H04L 5/0094 |
| 9,425,925 B2* | 8/2016 | Lee | ........ | H04L 1/1861 |
| 9,444,513 B2* | 9/2016 | Yu | ............. | H04B 1/56 |
| 9,521,669 B2* | 12/2016 | Wang | .......... | H04L 1/1822 |
| 9,538,565 B2* | 1/2017 | He | .......... | H04L 5/0037 |
| 9,635,668 B2* | 4/2017 | Golitschek Edler von Elbwart ... H04L 5/0094 | | |
| 9,722,760 B2* | 8/2017 | Stern-Berkowitz | ....... | H04L 5/14 |
| 9,723,626 B2* | 8/2017 | Golitschek Edler Von Elbwart | ............ | H04W 74/0833 |
| 9,844,039 B2* | 12/2017 | Shimezawa | ........... | H04W 5/1469 |
| 9,848,438 B2* | 12/2017 | Shimezawa | ........... | H04L 1/0026 |
| 9,924,396 B2* | 3/2018 | Takahashi | .............. | H04L 5/1469 |
| 9,930,678 B2* | 3/2018 | Kumar | .................. | H04W 72/082 |
| 10,243,708 B2* | 3/2019 | Cui | .................... | H04W 72/042 |
| 10,292,065 B2* | 5/2019 | Takahashi | ............ | H04B 7/0626 |
| 10,292,143 B2* | 5/2019 | Chatterjee | ......... | H04W 72/0446 |
| 10,305,642 B2* | 5/2019 | Cui | .................... | H04B 7/2656 |
| 10,498,519 B2* | 12/2019 | Stern-Berkowitz ......................... H04L 1/1854 | | |
| 10,499,419 B2* | 12/2019 | Lee | ........ | H04L 5/0091 |
| 10,531,483 B2* | 1/2020 | Golitschek Edler von Elbwart ... H04L 1/1861 | | |
| 10,567,122 B2* | 2/2020 | Cui | .................... | H04W 72/1268 |
| 10,749,652 B2* | 8/2020 | Chen | ................ | H04L 1/1887 |
| 10,887,069 B2* | 1/2021 | Xu | ......................... | H04L 5/0048 |
| 10,892,859 B2* | 1/2021 | Lee | ........ | H04L 1/0071 |
| 10,917,909 B2* | 2/2021 | Golitschek Edler von Elbwart ... H04L 1/0041 | | |
| 11,012,215 B2* | 5/2021 | Liu | ......................... | H04L 5/0051 |
| 11,044,625 B2* | 6/2021 | Takahashi | .......... | H04W 72/1268 |
| 11,050,520 B2* | 6/2021 | Li | ......................... | H04L 1/1874 |
| 2008/0080476 A1* | 4/2008 | Cho | ....... | H04L 5/0007 370/350 |
| 2011/0035639 A1* | 2/2011 | Earnshaw | ............. | H04L 1/1874 714/748 |
| 2011/0211503 A1* | 9/2011 | Che | .................... | H04W 72/042 370/280 |
| 2013/0194980 A1* | 8/2013 | Yin | ........... | H04L 1/1607 370/280 |
| 2013/0242816 A1* | 9/2013 | He | ............ | H04W 72/04 370/280 |
| 2013/0242931 A1* | 9/2013 | Bi | .................... | H04L 1/1854 370/329 |
| 2013/0272169 A1* | 10/2013 | Wang | ........... | H04L 1/1822 370/280 |
| 2014/0010213 A1* | 1/2014 | Wang | ................ | H04W 72/0413 370/336 |
| 2014/0023004 A1* | 1/2014 | Kumar | ................ | H04L 1/1887 370/329 |
| 2014/0086112 A1* | 3/2014 | Stern-Berkowitz ......................... H04L 1/1854 370/280 | | |
| 2014/0086113 A1* | 3/2014 | Ji | ........... | H04L 1/1896 370/280 |
| 2014/0126506 A1* | 5/2014 | Horiuchi | ............... | H04L 5/0048 370/329 |
| 2014/0269452 A1* | 9/2014 | Papasakellariou | .... | H04L 1/1854 370/280 |
| 2014/0293843 A1* | 10/2014 | Papasakellariou | .... | H04L 5/0053 370/280 |
| 2014/0293883 A1* | 10/2014 | Wang | .................... | H04L 5/0055 370/329 |
| 2014/0307595 A1* | 10/2014 | Chen | ..................... | H04L 5/0028 370/280 |
| 2014/0362798 A1* | 12/2014 | Shu | ........ | H04L 1/1861 370/329 |
| 2015/0016318 A1* | 1/2015 | Lee | ........... | H04L 5/14 370/280 |
| 2015/0110082 A1* | 4/2015 | Sun | .................... | H04W 72/082 370/336 |
| 2015/0131579 A1* | 5/2015 | Li | .......... | H04L 1/1858 370/329 |
| 2015/0365925 A1* | 12/2015 | Fu | .......... | H04L 1/0026 370/329 |
| 2016/0013902 A1* | 1/2016 | Cui | .................... | H04L 5/0048 370/329 |
| 2016/0021655 A1* | 1/2016 | Seo | ....... | H04W 76/14 370/280 |
| 2016/0072617 A1 | 3/2016 | Nagata et al. | | |
| 2016/0234833 A1* | 8/2016 | Shimezawa | ........... | H04L 1/1812 |
| 2016/0234860 A1* | 8/2016 | Shimezawa | ........... | H04L 1/1864 |
| 2016/0302174 A1* | 10/2016 | Chatterjee | ............. | H04B 7/0486 |
| 2017/0265207 A1* | 9/2017 | Takeda | .................. | H04L 5/0055 |
| 2017/0373801 A1* | 12/2017 | Bergstrom | ............ | H04L 1/1896 |
| 2018/0062796 A1* | 3/2018 | Feng | ................... | H04L 5/0055 |
| 2019/0109692 A1* | 4/2019 | Gao | .......................... | H04L 1/18 |
| 2019/0334678 A1* | 10/2019 | Liu | ........................ | H04L 5/0051 |
| 2019/0356423 A1* | 11/2019 | Lee | ...................... | H04L 1/1854 |
| 2020/0036497 A1* | 1/2020 | Xu | ........................ | H04L 5/0053 |
| 2020/0076559 A1* | 3/2020 | Yoshimura | ........ | H04W 72/0413 |
| 2021/0227522 A1* | 7/2021 | Lin | ....................... | H04L 5/0057 |

FOREIGN PATENT DOCUMENTS

| | | | | |
|---|---|---|---|---|
| CN | 110100491 A | * | 8/2019 | ........... H04L 5/0051 |
| EP | 2661136 A2 | | 11/2013 | |
| EP | 3119024 A1 | | 1/2017 | |
| EP | 3565338 A1 | * | 11/2019 | ........... H04L 5/0051 |
| EP | 3565338 A4 | * | 1/2020 | ........... H04L 5/0051 |
| WO | 2014157979 A1 | | 10/2014 | |
| WO | 2016069141 A1 | | 5/2016 | |
| WO | WO-2018126365 A1 | * | 7/2018 | ........... H04L 5/0051 |
| WO | WO-2018128200 A1 | * | 7/2018 | ........... H04L 1/1819 |

OTHER PUBLICATIONS

NTT DOCOMO, Inc. et al., "WF on scheduling and HARQ-ACK feedback timing," 3GPP TSG RAN WG1 AH_NR Meeting, R1-1701354, Spokane, WA, USA, Jan. 16-20, 2017, 4 pages.

* cited by examiner

INFORMATION TRANSMISSION METHOD AND DEVICE

CROSS-REFERENCE TO RELATED APPLICATIONS

This application is a continuation of International Application No. PCT/CN2018/095781, filed on Jul. 16, 2018, which claims priority to Chinese Patent Application No. 201710587801.6, filed on Jul. 18, 2017. The disclosures of the aforementioned applications are hereby incorporated by reference in their entireties.

TECHNICAL FIELD

This application relates to the communications field, and more particularly, to an information transmission method and device.

BACKGROUND

In a wireless communications system, duplex can be divided into time division duplex (TDD) and frequency division duplex (FDD) according to different duplex modes. Because distribution of terminal devices is uneven in a communications network, and different terminal devices may have different uplink-downlink traffic, there may be a difference between uplink-downlink traffic of different network devices in the same period. However, in an existing TDD or FDD mode, different network devices use the same uplink-downlink transmission configuration in the same period, and cannot effectively meet an actual requirement of each network device traffic. Therefore, a more flexible duplex technology is introduced, that is, uplink-downlink transmission of each cell can be individually configured based on an actual service requirement, and the duplex technology is usually referred to as a flexible duplex technology.

In the existing flexible duplex technology, flexibility of information transmission between a network device and a terminal device still has a limitation. How to improve flexibility of information transmission becomes an urgent technical problem to be resolved.

SUMMARY

This application provides an information transmission method and device, so that flexibility of information transmission can be improved.

According to a first aspect, an information transmission method is provided, including: determining, by a terminal device when an uplink-downlink configuration between the terminal device and a network device is a first uplink-downlink configuration, a first resource used to transmit first information of the terminal device; receiving, by the terminal device, indication information from the network device, where the indication information is used to indicate that the uplink-downlink configuration is a second uplink-downlink configuration; determining, by the terminal device based on the indication information, a second resource used to transmit the first information; and transmitting, by the terminal device, the first information with the network device on the second resource.

In this embodiment of this application, in a case in which the first resource used to transmit the first information is determined, the network device can still dynamically adjust the uplink-downlink configuration based on an actual case, so that flexibility of information transmission between the network device and the terminal device can be improved. Further, in a case in which the uplink-downlink configuration changes, the terminal device re-determines the second resource used to transmit the first information, so that the first information can be correctly transmitted. In other words, the method according to this embodiment of this application can not only improve the flexibility of the information transmission, but also enable information to be correctly transmitted, so that the method has better flexibility and applicability.

In a possible implementation, the determining, by a terminal device, a first resource used to transmit first information includes: receiving, by the terminal device, first scheduling information of the first information from the network device, where the first scheduling information is used to indicate the first resource; and determining, by the terminal device, the first resource based on the first scheduling information.

In this embodiment of this application, the terminal device receives a transmission resource configured by the network device for the first information, and the uplink-downlink configuration can be dynamically adjusted before the first information is transmitted, so that the flexibility of the information transmission can be improved.

In a possible implementation, when the terminal device receives the indication information from the network device, or after the terminal device receives the indication information from the network device, the method further includes: receiving, by the terminal device, second scheduling information of the first information from the network device, where the second scheduling information is used to indicate the second resource; and the determining, by the terminal device based on the indication information, a second resource used to transmit the first information includes: determining, by the terminal device, the second resource based on the indication information and the second scheduling information.

In this embodiment of this application, the network device reallocates a transmission resource for the first information, so that a system can correctly transmit information. Further, if the first information is data, due to a relatively large overhead of data transmission, the network device reallocates a transmission resource for the first information. This further facilitates information transmission of the system.

Optionally, in a possible implementation, the transmitting, by the terminal device, the first information with the network device on the second resource includes: transmitting, by the terminal device based on a transmission parameter, the first information with the network device on the second resource, where the transmission parameter is a preset parameter used to transmit, by the network device and the terminal device, the first information on the first resource.

In this embodiment of this application, the transmission parameter is used in the terminal device, to help reduce a signaling overhead.

In a possible implementation, the first information is first feedback information used to indicate whether first data is correctly received, the first resource is a first time unit, the second resource is a second time unit, and the method further includes: determining, by the terminal device, a second resource index based on a first resource index and a first index offset, where the second resource index satisfies the following formula: $n = n' + n_{offset}$, where $n'$ is the first resource index, the first resource index is an index of a resource used to transmit the first feedback information in a third resource, a time domain resource of the third resource is the first time unit, n is the second resource index, the second resource index is an index of a resource used to transmit the first feedback information in a fourth resource, a time domain resource of the fourth resource is the second time unit, and $n_{offset}$ is the first index offset; and the transmitting, by the terminal device, the first information with the network device on the second resource includes: transmitting, by the terminal device, the first information with the network device on a time-frequency resource corresponding to the second index offset.

In this embodiment of this application, the first index offset exists between the first resource index and the second resource index, to reduce a probability of an information collision and transmit information correctly.

In a possible implementation, the terminal device determines the first index offset based on an index of the second time unit, the second uplink-downlink configuration and a mapping table, where the mapping table records a correspondence among an index of a time unit, an uplink-downlink configuration and an index offset, or the mapping table records a correspondence among an index of a time unit, an uplink-downlink configuration and an offset parameter, where the offset parameter is used to determine an index offset; or the terminal device receives offset information from the network device, and determines the first index offset based on the offset information, where the offset information is used to indicate the first index offset.

In this embodiment of this application, the terminal device can obtain the first index offset in a plurality of manners. Therefore, the solution has relatively high compatibility and practicability.

Optionally, in a possible implementation, the first resource is used for first direction transmission in the first uplink-downlink configuration; the first resource is used for the first direction transmission in the second uplink-downlink configuration; and the second resource determined by the terminal device based on the indication information is the first resource.

In this embodiment of this application, if a use of the first resource is not changed, the terminal device can transmit the first information through the first resource. The solution can reduce operation complexity of the system and has relatively good practicability.

According to a second aspect, an information transmission method is provided. The method includes: determining, by a network device when an uplink-downlink configuration between the network device and a terminal device is a first uplink-downlink configuration, a first resource used to transmit first information; sending, by the network device, indication information after determining that the uplink-downlink configuration between the network device and the terminal device is a second uplink-downlink configuration, where the indication information is used to indicate that the uplink-downlink configuration is the second uplink-downlink configuration; determining, by the network device based on the second uplink-downlink configuration, a second resource used to transmit the first information; and transmitting, by the network device, the first information with the terminal device on the second resource.

In this embodiment of this application, in a case in which the network device determines the first resource used to transmit the first information, the network device can still dynamically adjust the uplink-downlink configuration based on an actual case, so that flexibility of information transmission between the network device and the terminal device can be improved. Further, in a case in which the uplink-downlink configuration changes, the network device re-determines the second resource used to transmit the first information, so that the first information can be correctly transmitted. In other words, the method according to this embodiment of this application can not only improve flexibility of information transmission, but also enable information to be correctly transmitted; therefore, the method has relatively good flexibility and applicability.

In a possible implementation, before the network device sends the indication information, the method includes: sending, by the network device, first scheduling information of the first information to the terminal device, where the first scheduling information is used for the terminal device to determine the first resource.

In this embodiment of this application, even if the network device configures a transmission resource for transmission of the first information, the network device can still dynamically change the uplink-downlink configuration, so that flexibility of information transmission can be improved.

In a possible implementation, when the network device sends the indication information, or after the network device sends the indication information, the method further includes: sending, by the network device, second scheduling information of the first information to the terminal device, where the second scheduling information is used to indicate the second resource.

In this embodiment of this application, the network device reallocates a transmission resource for the first information, so that a system can correctly transmit information. Further, if the first information is data, due to a relatively large overhead of data transmission, the network device reallocates a transmission resource for the first information. This further facilitates information transmission of the system.

Optionally, in a possible implementation, the transmitting, by the network device, the first information with the terminal device on the second resource includes: transmitting, by the network device based on a transmission parameter, the first information with the terminal device on the second resource, where the transmission parameter is used to transmit, by the network device and the terminal device, the first information on the first resource.

In this embodiment of this application, the transmission parameter is used in the network device, to help reduce a signaling overhead.

In a possible implementation, the first information is first feedback information used to indicate whether first data is correctly received, the first resource is a first time unit, the second resource is a second time unit, and the method further includes: determining, by the network device, a second resource index based on a first resource index and a first index offset, where the second resource index satisfies the following formula: $n=n'+n_{offset}$, where n' is the first resource index, the first resource index is an index of a resource used to transmit the first feedback information in a third resource, a time domain resource of the third resource is the first time unit, n is the second resource index, the second resource index is an index of a resource used to transmit the first feedback information in a fourth resource, a time domain resource of the fourth resource is the second time unit, and $n_{offset}$ is the first index offset; and the transmitting, by the network device, the first information with the terminal device on the second resource includes: transmitting, by the network device, the first information with the terminal device on a time-frequency resource corresponding to the second index offset.

In this embodiment of this application, the first index offset exists between the first resource index and the second resource index, to help reduce a probability of an information collision and transmit information correctly.

In a possible implementation, the method further includes: determining, by the network device, the first index offset based on an index of the second time unit, the second uplink-downlink configuration and a mapping table, where the mapping table records a correspondence among an index of a time unit, an uplink-downlink configuration and an index offset, or the mapping table records a correspondence among an index of a time unit, an uplink-downlink configuration and an offset parameter, where the offset parameter is used to determine an index offset; or determining, by the network device, offset information based on the first index offset, and sending the offset information, where the offset information is used to indicate the first index offset.

In this embodiment of this application, the network device can obtain the first index offset in a plurality of manners. Therefore, the solution has relatively high compatibility and practicability.

In a possible implementation, the first resource is used for first direction transmission in the first uplink-downlink configuration; the first resource is used for the first direction transmission in the second uplink-downlink configuration; and the second resource determined by the network device is the first resource.

In this embodiment of this application, if a use of the first resource is not changed, the network device can transmit the first information through the first resource. The solution can reduce operation complexity of the system and has relatively good practicability.

In any one of the foregoing aspects or any one of the possible implementations of the foregoing aspects, the first resource is used for first direction transmission in the first uplink-downlink configuration; and the first resource is used for second direction transmission and the second resource is used for the first direction transmission in the second uplink-downlink configuration.

In this embodiment of this application, the first information is information of the first direction transmission, and the terminal device transmits the first information through the second resource, so that the first information can be normally transmitted.

In any one of the foregoing aspects or any one of the possible implementations of the foregoing aspects, the first resource is a first time unit, and the second resource is the first time unit that is used for the first direction transmission and that follows the first time unit in the second uplink-downlink configuration; or a time domain resource of the first resource is a first time unit, and a time domain resource of the second resource is the first time unit that is used for the first direction transmission and that follows the first time unit in the second uplink-downlink configuration.

In this embodiment of this application, the network device and the terminal device may predetermine a transmission rule without an extra signaling indication of the network device, to help reduce a signaling overhead. Further, if the first information is the feedback information, because the feedback information occupies a relatively small quantity of bits, the system can correctly transmit information.

Optionally, in any one of the foregoing aspects or any one of the possible implementations of the foregoing aspects, the first index offset satisfies: $n_{offset} \geq n_{total}$, where $n_{total}$ is a size of a resource that is used to transmit feedback information and that is included in the fourth resource before the first time unit is changed from being used for the first direction transmission to being used for the second direction transmission.

In this embodiment of this application, the first index offset is greater than $n_{total}$, to help reduce a probability of an information collision and transmit information correctly.

Optional, in any one of the foregoing aspects or any one of the possible implementations of the foregoing aspects, the first direction transmission is downlink transmission, the first resource index is specifically a resource index of a physical hybrid ARQ indicator channel (PHICH) resource used to send, by the network device, the first feedback information in the first resource, and the second resource index is specifically an index of a PHICH resource used to send, by the network device, the first feedback information in the second resource.

Optionally, in any one of the foregoing aspects or any one of the possible implementations of the foregoing aspects, the resource index of the PHICH resource includes a group index of the PHICH resource.

Optional, in any one of the foregoing aspects or any one of the possible implementations of the foregoing aspects, the first direction transmission is uplink transmission, the first resource index is specifically a resource index of a physical uplink control channel (PUCCH) resource used to send, by the terminal device, the first feedback information in the first resource, and the second resource index is specifically a resource index of a PUCCH resource used to send, by the terminal device, the first feedback information in the second resource.

According to a third aspect, an information transmission device is provided. The information transmission device includes each unit configured to perform the first aspect or any one of the possible implementations of the first aspect. The information transmission device may be a terminal device or a baseband chip.

According to a fourth aspect, an information transmission device is provided. The information transmission device includes each unit configured to perform the second aspect or any one of the possible implementations of the second aspect. The information transmission device may be a network device or a baseband chip.

According to a fifth aspect, an information transmission device is provided. The information transmission device includes a transceiver component and a processor, enabling the information transmission device to perform the method according to the first aspect or any one of the possible implementations of the first aspect. The information transmission device may be a terminal device or a baseband chip. If the information transmission device is the terminal device, the transceiver component may be a transceiver, or if the information transmission device is the baseband chip, the transceiver component may be an input/output circuit of the baseband chip.

According to a sixth aspect, an information transmission device is provided. The information transmission device includes a transceiver component and a processor, enabling the information transmission device to perform the method according to the second aspect or any one of the possible implementations of the second aspect. The information transmission device may be a network device or a baseband chip. If the information transmission device is the network device, the transceiver component may be a transceiver, or if the information transmission device is the baseband chip, the transceiver component may be an input/output circuit of the baseband chip.

According to a seventh aspect, a computer program product is provided. The computer program product includes computer program code. When the computer program code is run by a terminal device, the terminal device is enabled to perform the method according to the first aspect or any one of the possible implementations of the first aspect.

According to an eighth aspect, a computer program product is provided. The computer program product includes computer program code. When the computer program code is run by a network device, the network device is enabled to perform the method according to the second aspect or any one of the possible implementations of the second aspect.

According to a ninth aspect, a computer-readable medium is provided. The computer-readable medium stores program code, and the program code includes an instruction used to perform the method according to the first aspect or any one of the possible implementations of the first aspect.

According to a tenth aspect, a computer-readable medium is provided. The computer-readable medium stores program code, and the program code includes an instruction used to perform the method according to the second aspect or any one of the possible implementations of the second aspect.

In this embodiment of this application, the network device determines the first resource used to transmit the first information, and the network device can dynamically adjust the uplink-downlink configuration based on an actual case, so that flexibility of information transmission between the network device and the terminal device can be improved. Further, in a case in which the uplink-downlink configuration changes, the terminal device re-determines the second resource used to transmit the first information, so that the first information can be correctly transmitted. In other words, the method of this embodiment of this application can not only improve flexibility of information transmission, but also enable information to be correctly transmitted, so that the method has relatively good flexibility and applicability.

DETAILED DESCRIPTION OF ILLUSTRATIVE EMBODIMENTS

Figure 1:
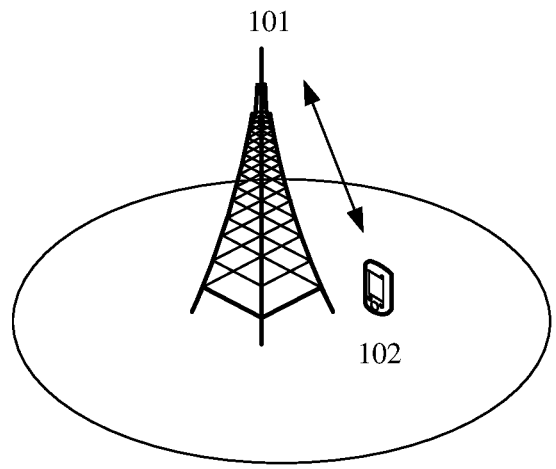
FIG. 1 is an application scenario applicable to an embodiment of this application.

The following describes technical solutions of this application with reference to accompanying drawings.

It should be understood that, the division of manners, cases, and categories in this embodiment of this application is merely for ease of description, and should not be construed as a particular limitation. Features in various manners, categories, and cases can be combined without contradiction.

It should be further understood that the terms "first", "second", and "third" in this embodiment of this application are used for distinguishing purposes only, and should not be construed as any limitation on this application.

A method of this embodiment of this application may be applied to a new radio (new radio, NR) communications system, a long term evolution (LTE) system, a long term evolution-advanced (LTE-A) system, an enhanced long term evolution-advanced (eLTE), or may be extended to a similar wireless communications system, such as a cellular system related to wireless-fidelity (WiFi), worldwide interoperability for microwave access (WIMAX), and a 3rd generation partnership project (3gpp).

In this embodiment of this application, a network device is a device deployed in a radio access network to provide a wireless communications function for a terminal device. The network device may include various forms of base stations, such as a macro base station, a micro base station (also referred to as a small cell), a relay station, an access point, a new radio controller (NR controller), a centralized unit, a radio frequency remote module, a distributed unit, a transmission reception point (TRP), a transmission point (TP), or any other wireless access device, but this embodiment of this application is not limited thereto. In a system with different radio access technologies, a device with a base station function may have different names. For example, the network device may be an access point (AP) in a wireless local area network (WLAN), or an evolved NodeB (eNB, or eNodeB) in an LTE system. Alternatively, the network device may further be a Node B in a 3rd generation (3G) system. In addition, the network device may further be a relay station or an access point, a vehicle-mounted device, a network device in a future 5th generation (5G) network, a network device in a future evolved public land mobile network (PLMN), or the like.

In this embodiment of this application, the terminal device may include various handheld devices, vehicle-mounted devices, wearable devices and computing devices having wireless communications functions, or another processing device connected to a wireless modem. The terminal device may be a device in a communications system (for example, 5G) that accesses a network side through the network device (for example, the NR or the TRP), or may be referred to as user equipment (UE). The user equipment is a device that provides voice and/or data connectivity to a user, for example, a handheld device or a vehicle-mounted device having a wireless communications function. A common terminal includes, for example, a mobile phone, a tablet computer, a notebook computer, a palmtop computer, a mobile internet device (MID), and a wearable device such as a smartwatch, a smart band, or a pedometer.

For ease of understanding the embodiments of this application, concepts and technologies involved in the embodiments of this application are briefly introduced first.

First direction transmission (second direction transmission): In the embodiments of this application, first direction transmission and second direction transmission are two types of transmission in different directions. For example, the first direction transmission is uplink transmission, and the second direction transmission is downlink transmission. For another example, the first direction transmission is downlink transmission, and the second direction transmission is uplink transmission. Specific cases of the first direction transmission and the second direction transmission may be flexibly set based on a requirement, and this is not limited in this embodiment of this application.

Time unit: In the embodiments of this application, a time unit is a length of time. For example, the time unit may be a subframe, a slot, a mini-slot, or a symbol, and the time unit may alternatively be a plurality of subframes, a plurality of slots, a plurality of mini-slots, a plurality of symbols, or the like. Further, the time unit may be a time unit used to schedule a transport block in a communications system. For example, the time unit may be a transmission time interval (TTI).

Time unit group: A time unit group includes N time units, and each time unit has a number in the time unit group. For example, the time unit group may be a frame, and the time unit is a subframe. For another example, the time unit group may be a subframe, and the time unit is a symbol. For still another example, the time unit group may be a slot, and the time unit is a symbol.

Uplink-downlink configuration: In the embodiments of this application, an uplink-downlink configuration may be used to indicate a time unit used for uplink transmission and a time unit used for downlink transmission in N (N>1) time units (the N time units may be the foregoing time unit group, that is, each time unit group includes N time units). In other words, the uplink-downlink configuration may be used to indicate a use of the N time units. It should be understood that the use includes uplink transmission or downlink transmission. For example, assuming that the time unit is a subframe, the uplink-downlink configuration may be a TDD frame configuration in an LTE system. For another example, assuming that the time unit is a symbol, the uplink-downlink configuration may be used to indicate a use of each symbol in one subframe.

Hybrid automatic repeat request (HARQ) transmission: HARQ transmission may include downlink HARQ transmission and uplink HARQ transmission.

Downlink HARQ transmission: A network device may indicate, to a terminal device, a resource used for the network device to send data downstream. Usually, the resource indication process is referred to as "downlink scheduling grant", and the data sent downstream by the network device is referred to as "downlink data". An interval between the downlink scheduling grant and the downlink data is n (n≥0) time units. In other words, the terminal device may receive the downlink scheduling grant and the downlink data in one time unit (n=0); or the terminal device may receive the downlink scheduling grant and then receive, after n time units used for downlink transmission, the downlink data (n>0).

Uplink HARQ transmission: A network device may indicate, to a terminal device, a resource used for the terminal device to send data upstream. Usually, the resource indication process is referred to as "uplink scheduling grant", and the data sent upstream by the terminal device is referred to as "uplink data". An interval between the uplink scheduling grant and the uplink data is m time units. In other words, the terminal device may receive the uplink scheduling grant and then send, after m (m>0) time units used for uplink transmission, the uplink data.

For both the uplink HARQ transmission and the downlink HARQ transmission, feedback information used to indicate whether the data is correctly received is fed back after k (k>0) time units after the data transmission.

The feedback information includes an acknowledgement (ACK) used to indicate that the data is correctly received, and a negative acknowledgement (NACK) used to indicate that the data is not correctly received.

In an existing system, values n, m, and k may be different but fixed. Using k as an example, that k may have different values may include: k may have different values in different uplink-downlink configurations, and different time units may correspond to different k. That k may have a fixed value may include: the time unit may correspond to a fixed k based on each uplink and downlink configuration.

For example, assuming that the uplink-downlink configuration is a TDD frame configuration in an LTE system, Table 1 shows the TDD frame configuration in the LTE system.

TABLE 1

| TDD frame configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | D | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For a downlink feedback of the uplink data, it is determined that a subframe of a physical hybrid ARQ indicator channel (PHICH) corresponding to each uplink subframe (a subframe used for the uplink transmission) of each TDD frame configuration is a $k^{th}$ subframe that follows the uplink subframe. For ease of description, k of the downlink feedback of the uplink data may be denoted as $k_1$. Table 2 shows values of $k_1$ based on the TDD frame configuration.

TABLE 2

| TDD frame configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

As shown in Table 2, in a TDD frame configuration 0, $k_1$ corresponding to a subframe 2 is 4, that is, uplink data sent by the subframe 2 is fed back in a subframe 6; and $k_1$ corresponding to a subframe 3 is 7, that is, uplink data sent by the subframe 3 is fed back in a subframe 0 of a next radio frame. The $k_1$ of the subframe 2 is different from the $k_1$ of the subframe 3, while the $k_1$ of the subframe 2 is fixed to 4 and the $k_1$ of the subframe 3 is fixed to 7.

For an uplink feedback of the downlink data, it is determined that a downlink subframe (a subframe used for the downlink transmission) corresponding to a physical uplink control channel (PUCCH) of each uplink subframe of each TDD frame configuration is a $k^{th}$ subframe that precedes the uplink subframe. For ease of description, k of the uplink feedback of the downlink data may be denoted as $k_2$. Table 3 shows values of $k_2$ based on the TDD frame configuration.

TABLE 3

| TDD frame configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | | 4 |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

As shown in Table 3, in a TDD frame configuration 0, $k_2$ corresponding to a subframe 2 is 6, that is, an uplink feedback sent by the subframe 2 is a feedback for downlink data of a subframe 6 in a previous radio frame; and $k_2$ corresponding to a subframe 4 is 4, that is, an uplink feedback sent by the subframe 4 is a feedback for downlink data of a subframe 0. The $k_2$ of the subframe 2 is different from the $k_2$ of the subframe 4, while the $k_2$ of the subframe 2 is fixed to 6 and the k of the subframe 4 is fixed to 4.

In a new radio (NR) system, the network device can flexibly set values n, m, and $k_1$ and indicate the values of n, m, and k to the terminal device. For example, the network device can indicate the values n, m, and k to the terminal device by sending downlink control information (DCI).

In a current technology, the network device notifies the terminal device of an uplink-downlink configuration of the cell. In the uplink-downlink configuration, the network device and the terminal device respectively determine a resource used to transmit information, and transmit the information by using the resource. During this period, the network device and the terminal device transmit the information strictly based on the uplink-downlink configuration, so that the information can be correctly transmitted.

Transmitting the information by using this mode can ensure that the information is correctly transmitted. However, in an actual application, a burst often occurs in the network, while the network device and the terminal device transmit the information strictly based on the uplink-downlink configuration of the cell, and flexibility of information transmission still has a relatively great limitation.

Based on this, the embodiments of this application provide an information transmission method and device, to improve the flexibility of the information transmission.

FIG. 1 is an application scenario applicable to an embodiment of this application. As shown in FIG. 1, the application scenario includes a network device 101, and further includes a terminal device 102 located within a coverage area of the network device 101. There may be a plurality of terminal devices 102.

In the embodiments of this application, the network device 101 may dynamically change an uplink-downlink configuration between the network device 101 and the terminal device 102 based on an actual case.

The method of the embodiments of this application is described in detail below with reference to FIG. 2 to FIG. 6.

Figure 2:
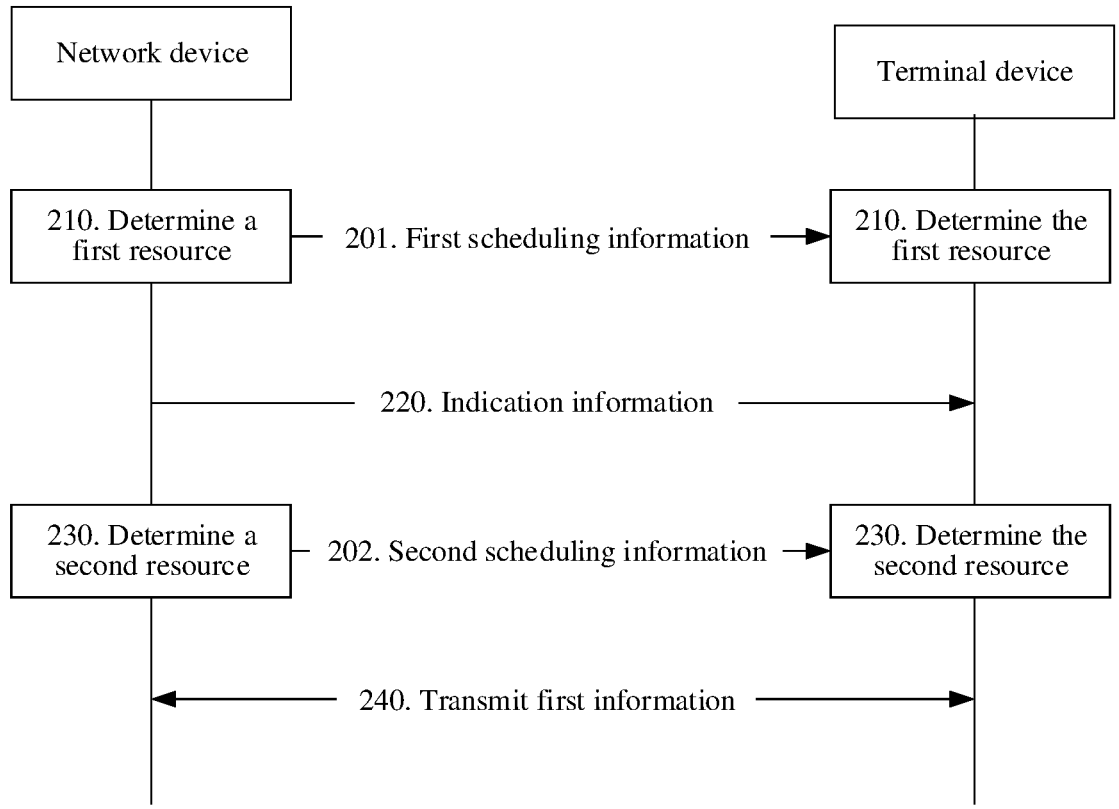
FIG. 2 is a schematic interaction diagram of an example of a method according to an embodiment of this application.

FIG. 2 is a schematic interaction diagram of an example of a method according to an embodiment of this application. It should be understood that FIG. 2 shows detailed steps or operations of a method 200, but the steps or operations are merely examples, and the embodiments of this application may alternatively perform other operations or perform only some of the operations in FIG. 2. A network device and a terminal device in FIG. 2 may respectively correspond to the network device 101 and the terminal device 102 in the foregoing communications scenario.

As shown in FIG. 2, the method 200 may include 210, 220, 230 and 240.

210: A network device determines, when an uplink-downlink configuration between the network device and a terminal device is a first uplink-downlink configuration, a first resource used to transmit first information. Correspondingly, the terminal device determines the first resource used to transmit the first information.

It should be understood that the first information may be understood as a piece of (or some) information to be transmitted between the network device and the terminal device, and the first information may be uplink information (that is, information sent upstream by the terminal device) or downlink information (that is, information sent downstream by the network device). The first information may include data or feedback information used to indicate whether the data is correctly received.

It should be further understood that a first resource or a second resource in the embodiments of this application may be a time domain resource. For example, the first resource is a first time unit, and the first resource and the second resource in the embodiments of this application may alternatively be time-frequency resources. For example, the first resource is a first time unit in a time domain and is a first frequency domain resource in a frequency domain. The first resource may alternatively be another type of resource used to transmit the first information. For ease of description, the first resource being the first time unit or a time domain resource of the first resource being the first time unit may be denoted as "the first resource corresponding to the first time unit". Similarly, the second resource corresponding to a second time unit described below may be understood as the second resource being the second time unit or a time domain resource of the second resource being the second time unit.

The terminal device can determine the first resource in a plurality of manners.

For example, assuming that the first information is feedback information, it can be seen from the above that the network device and the terminal device may predetermine a value k. The network device may further indicate the value k to the terminal device through DCI, and the terminal device may determine the first resource based on the value k.

For another example, assuming that the first information is data, the network device can indicate the first resource to the terminal device by sending scheduling information.

In other words, the method 200 may further include the following steps.

201: The network device sends first scheduling information of the first information to the terminal device, where the first scheduling information is used to indicate the first resource. Correspondingly, the terminal device receives the first scheduling information.

It should be understood that the first scheduling information can explicitly indicate the first resource. For example, assuming that the first resource corresponds to the first time unit, the first scheduling information may directly indicate an index number of the first time unit. The first scheduling information may also implicitly indicate the first resource. For example, assuming that the first resource corresponds to the first time unit, and the first scheduling information may also indicate the foregoing values of n, m, or k. The terminal device can determine the first time unit based on the values of n, m, or k.

220: The network device sends indication information after determining that the uplink-downlink configuration between the network device and the terminal device is a second uplink-downlink configuration. Correspondingly, the terminal device receives the indication information from the network device, where the indication information is used to indicate the second uplink-downlink configuration.

It should be understood that if the first information is the downlink information, the transmission of the first information between the network device and the terminal device is that the network device sends the first information to the terminal device, and correspondingly, the terminal device receives the first information from the network device. If the first information is the uplink information, the transmission of the first information between the network device and the terminal device is that the terminal device sends the first information to the network device, and correspondingly, the network device receives the first information from the terminal device.

Specifically, after the network device determines the first resource, or after the network device sends the first scheduling information, and before the network device transmits the first information with the terminal device, the network device can dynamically adjust the uplink-downlink configuration and send the indication information to the terminal device (that is, send an adjustment result of the uplink-downlink configuration). After receiving the indication information, the terminal device may learn that the uplink-downlink configuration changes from the first uplink-downlink configuration to the second uplink-downlink configuration.

Optionally, the network device may semi-statically configure the second uplink-downlink configuration, or dynamically configure the second uplink-downlink configuration. A condition that triggers the network device to change the uplink-downlink configuration may include a change period, a to-be-transmitted service, or the like. For example, the network device periodically changes the uplink-downlink configuration. For another example, the network device may change the uplink-downlink configuration based on traffic service, such as an ultra-reliable and low latency communications (URLLC) service.

230: The network device determines a second resource used to transmit the first information, and correspondingly, the terminal device determines, based on the indication information, the second resource used to transmit the first information.

Because the uplink-downlink configuration changes from the first uplink-downlink configuration to the second uplink-downlink configuration, the use of the time unit may change, and if the terminal device and the network device still transmit the first information based on the first resource, the first information may not be correctly transmitted.

Figure 3:
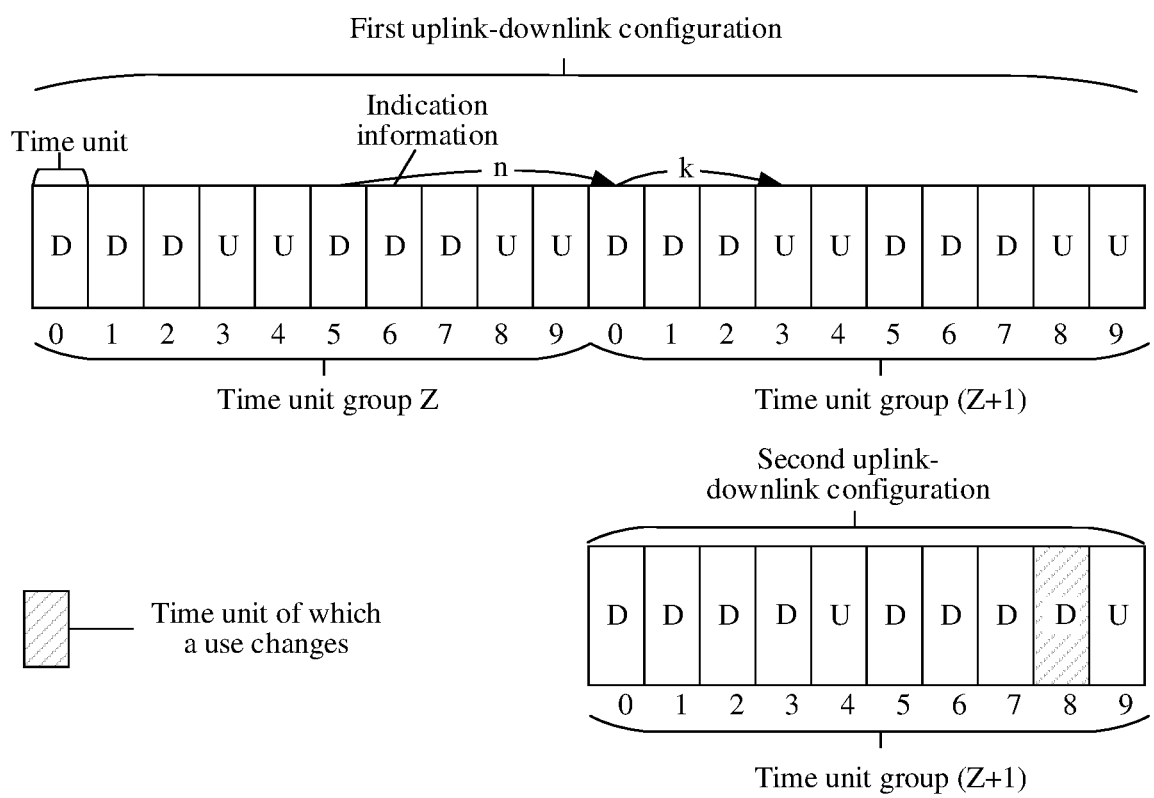
FIG. 3 is a schematic diagram of an example in which first information cannot be correctly transmitted.

FIG. 3 is a schematic diagram of an example in which first information cannot be correctly transmitted. It is assumed that the first information is uplink feedback information of first downlink data. As shown in FIG. 3, in a first uplink-downlink configuration, it can be seen from values n and k (for related descriptions of n and k, refer to the foregoing related description) that a time unit 3 (it should be understood that a time unit x may be understood as a time unit numbered x) of a time unit group (Z+1) is used to transmit the uplink feedback information of the first downlink data, that is, a first resource corresponds to the time unit 3. Before a network device and a terminal device transmit the uplink feedback information of the first downlink data, the uplink-downlink configuration changes from the first uplink-downlink configuration to a second uplink-downlink configuration. If the network device and the terminal device still transmit the uplink feedback information of the first downlink data on the first resource (the time unit 3), consequently, the uplink feedback information may fail to be transmitted.

Figure 4:
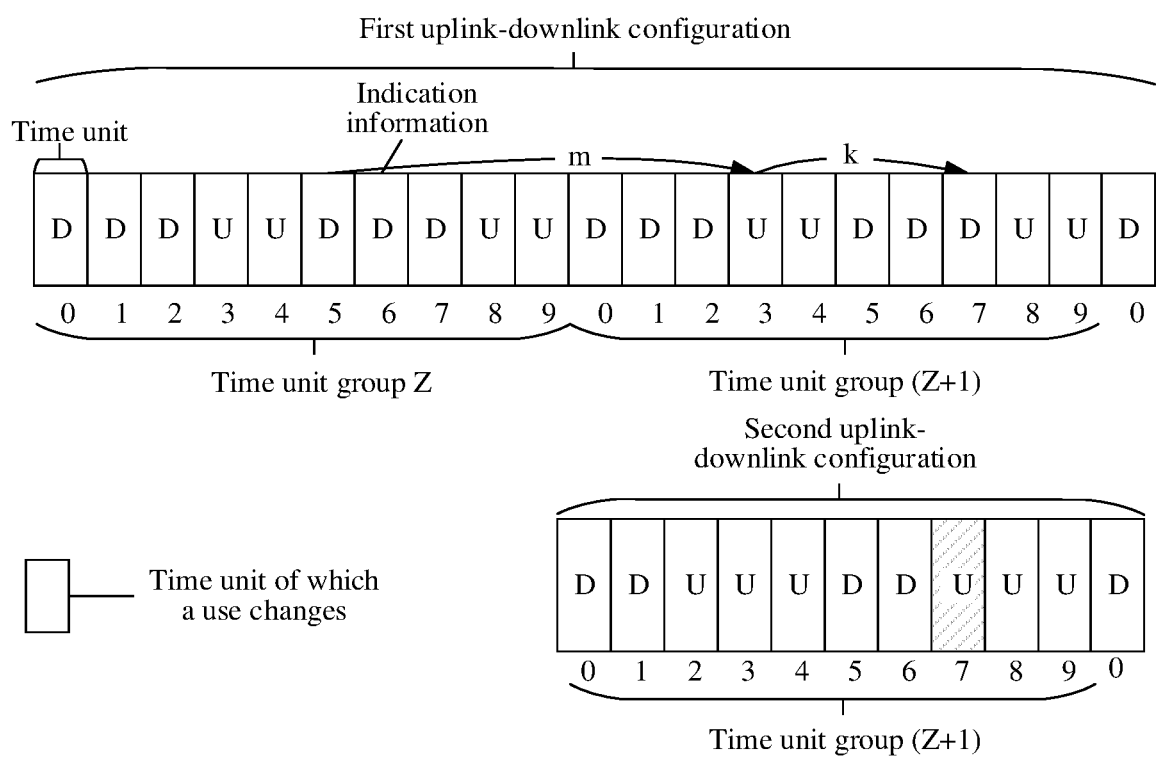
FIG. 4 is a schematic diagram of another example in which first information cannot be correctly transmitted.

FIG. 4 is a schematic diagram of another example in which first information cannot be correctly transmitted. It is assumed that the first information is downlink feedback information of first uplink data. As shown in FIG. 4, in a first uplink-downlink configuration, it can be seen from values m and k (for related descriptions of m and $k_1$ refer to the foregoing related description) that a time unit 7 of a time unit group (Z+1) is used to transmit the downlink feedback information of the first uplink data, that is, a first resource corresponds to the time unit 7. Before a network device and a terminal device transmit the downlink feedback information of the first uplink data, the uplink-downlink configuration changes from the first uplink-downlink configuration to a second uplink-downlink configuration. If the network device and the terminal device still transmit the downlink feedback information of the first uplink data on the first resource (the time unit 7), consequently, the downlink feedback information may fail to be transmitted.

Figure 5:
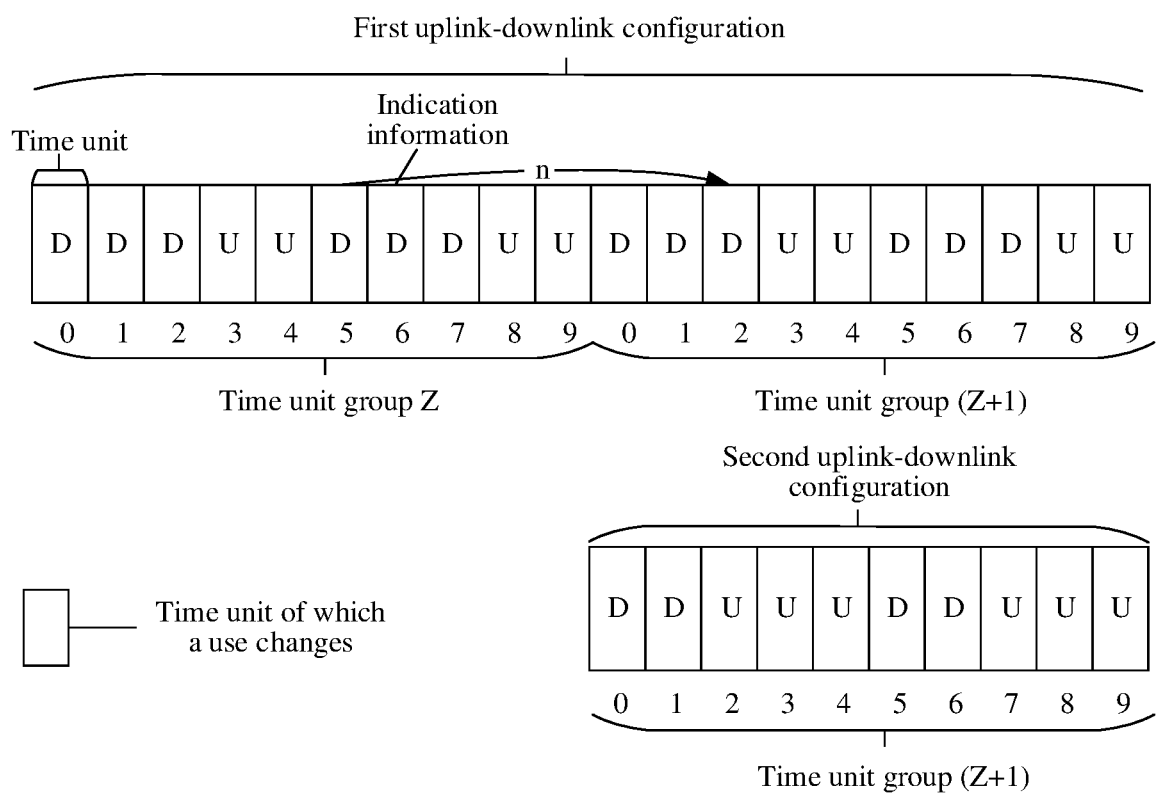
FIG. 5 is a schematic diagram of still another example in which first information cannot be correctly transmitted.

FIG. 5 is a schematic diagram of still another example in which first information cannot be correctly transmitted. It is assumed that the first information is second downlink data. As shown in FIG. 5, in a first uplink-downlink configuration, it can be seen from a value n that a time unit 2 of a time unit group (Z+1) is used to transmit the second downlink data, that is, a first resource corresponds to the time unit 2. Before a network device and a terminal device transmit the second downlink data, the uplink-downlink configuration changes from the first uplink-downlink configuration to a second uplink-downlink configuration. If the network device and the terminal device still transmit the second downlink data on the first resource (the time unit 2), consequently, the second downlink data may fail to be transmitted.

Figure 6:
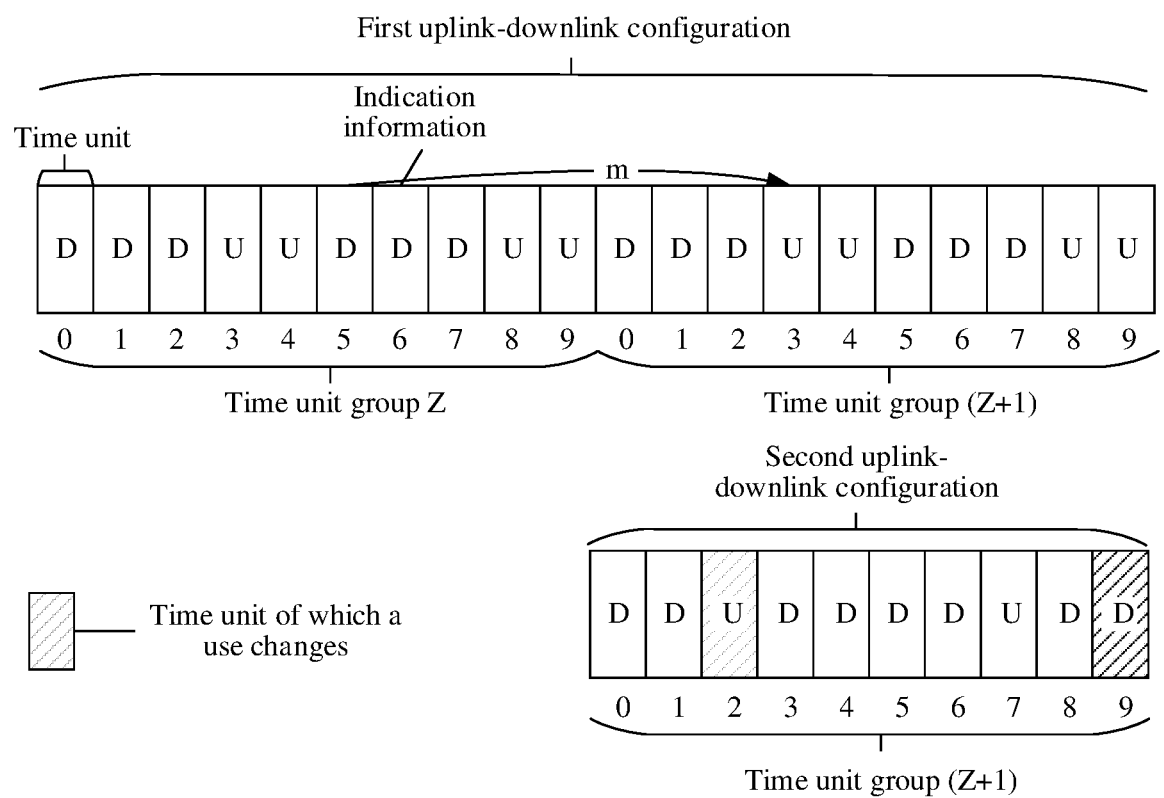
FIG. 6 is a schematic diagram of yet another example in which first information cannot be correctly transmitted.

FIG. 6 is a schematic diagram of yet another example in which first information cannot be correctly transmitted. It is assumed that the first information is second uplink data. As shown in FIG. 6, in a first uplink-downlink configuration, it can be seen from a value m that a time unit 3 of a time unit group (Z+1) is used to transmit the second uplink data, that is, a first resource corresponds to the time unit 3. Before a network device and a terminal device transmit the second uplink data, the uplink-downlink configuration changes from the first uplink-downlink configuration to a second uplink-downlink configuration. If the network device and the terminal device still transmit the second uplink data on the first resource (the time unit 3), consequently, the second uplink data may fail to be transmitted.

Based on the above, after the terminal device determines the first resource used to transmit the first information, and before the network device and the terminal device transmit the first information, if the uplink-downlink configuration changes and the terminal device still transmits the first information by using the predetermined first resource, consequently, the first information may fail to be transmitted. Therefore, the terminal device needs to determine the second resource used to transmit the first information, that is, the terminal device needs to determine a resource used to transmit the first information again.

Similarly, if the uplink-downlink configuration changes, the network device needs to determine a resource used to transmit the first information again.

It should be understood that the indication information of the embodiments of this application may be used as trigger information, to trigger the terminal device to determine the second resource of the first information. In other words, if the terminal device does not receive the indication information, the terminal device may transmit the first information with the network device by using the first resource.

The terminal device is used as an example (it should be understood that the related descriptions of the following manners and cases are also applicable to the network device without contradiction). Specifically, 230 may include at least the following two manners.

Manner 1: When the uplink-downlink configuration changes (from the first uplink-downlink configuration to the second uplink-downlink configuration), the terminal device needs to determine whether the use of the first resource changes or not, and determines the second resource based on a determining result. For example, in the first uplink-downlink configuration, the first resource is used for first direction transmission, and the terminal device needs to determine, in the second uplink-downlink configuration, whether the first resource changes from being used for the first direction transmission to being used for second direction transmission.

There are two possible cases based on Manner 1.

Case 1: If the first resource is still used for the first direction transmission, that is, a change in the uplink-downlink configuration does not affect the use of the first resource, the terminal device can continue to transmit the first information by using the first resource. In other words, the terminal device determines that the second resource is the first resource.

Still using FIG. 3 as an example, assuming that the first resource corresponds to a time unit 4 of the time unit group (Z+1), because the time unit 4 is still used for uplink transmission after the uplink-downlink configuration changes, the network device and the terminal device can still transmit the first information by using the first resource.

Case 2: If the first resource is changed from being used for the first direction transmission to being used for second direction transmission, that is, the change in the uplink-downlink configuration affects the use of the first resource, the terminal device determines the second resource, and the second resource belongs to a resource used for the first direction transmission in the second uplink-downlink configuration.

Still using FIG. 3 as an example, it can be seen from values of n and k that the first resource corresponds to the time unit 3 of the time unit group (Z+1), and because the time unit 3 is changed from being used for the uplink transmission to being used for downlink transmission, the terminal device determines that a time unit used for the uplink transmission is the second resource.

Based on Case 2, the manner in which the terminal device determines the second resource may include at least one of the following two manners.

1. Determine the Second Resource Based on a Preset Rule.

As an optional example, the network device and the terminal device may predetermine that, assuming that the first resource corresponds to the first time unit, a first available time unit that follows the first time unit is a time unit corresponding to the second resource.

For example, assuming that the first resource is the first time unit, the terminal device determines that the second resource is the first time unit that is used for the first direction transmission and that follows the first time unit in the second uplink-downlink configuration.

As an optional example, assuming that the first information is uplink feedback information of downlink data, first scheduling information indicates that the first information is transmitted in a time unit (x+n+k), where x is an index of a time unit in which the first scheduling information is received. For n and k, refer to the foregoing related description. Because a use of the time unit (x+n+k) changes, the terminal device may send the first information in the first time unit that is used for the uplink transmission and that follows the time unit (x+n+k).

Using FIG. 3 as an example, the first resource corresponds to the time unit 3. If the terminal device receives the indication information, the terminal device can determine that the second resource corresponds to the time unit 4.

As another optional example, assuming that the first information is downlink feedback information of uplink data, the first scheduling information indicates that the first information is transmitted in a time unit (x+m+k), where for x, m and $k_1$ refer to the foregoing related description. Because a use of the time unit (x+m+k) changes, the terminal device may send the first information in the first time unit that is used for the downlink transmission and that follows the time unit (x+m+k).

Using FIG. 4 as an example, the first resource corresponds to the time unit 7. If the terminal device receives the indication information, the terminal device determines that the second resource corresponds to a time unit 0 of a time unit group (Z+2). It should be understood that the time unit group (Z+2) is the first time unit group that follows the time unit group (Z+1).

If the first information is the feedback information, because the feedback information occupies a relatively small quantity of bits, determining the second resource based on the preset rule can help reduce impact of the first information on information transmitted through a second time unit.

2. Determine the Second Resource Based on Second Scheduling Information of the First Information.

In other words, when the terminal device receives the indication information from the network device, or after the terminal device receives the indication information from the network device, the method further includes.

202. The network device sends the second scheduling information of the first information to the terminal device. Correspondingly, the terminal device receives the second scheduling information of the first information from the network device, where the second scheduling information is used to indicate the second resource.

It should be understood that the second scheduling information and the indication information may be carried in different time units or in the same time unit.

It should be further understood that the second scheduling information can explicitly or implicitly indicate the second resource, and for specific descriptions, refer to the foregoing related description of the first information. For brevity, details are not described herein again.

230 may specifically include: determining, by the terminal device, the second resource based on the indication information and the second scheduling information.

If uses of a plurality of time units change, all preset information transmitted through the plurality of time units is transmitted through the first available time unit, and consequently, it is easy for the preset information transmitted through the plurality of time units to be transmitted in the same time unit, thereby resulting in a collision of information transmission. Based on this, the network device can determine that information of one of the plurality of time units is transmitted through the first available time unit.

In other words, the network device and the terminal device may predetermine that if scheduling information sent by the network device is used to indicate a time unit of which the use changes, information indicating the time unit of which the use changes needs to be transmitted preferably.

For example, the first information is information with a relatively high priority, the first resource used to transmit the first information corresponds to the first time unit, and the second scheduling information may be used to indicate, by indicating the first time unit, that the second time unit corresponding to the second resource is the first available time unit that follows the first time unit in the second uplink-downlink configuration.

In other words, the second scheduling information of the first information sent by the network device may be used to indicate the first time unit, and the terminal device determines, by receiving the second scheduling information, that information carried by the first time unit needs to be transmitted preferably, that is, the terminal device determines, by receiving the second scheduling information, that the second resource is the first available time unit that follows the first time unit.

Optionally, the network device and the terminal device can also determine that if the scheduling information indicates the time unit of which the use changes, it is preset that the information transmitted by the first available time unit that follows the time unit of which the use changes needs to be rescheduled.

Manner 2: When the uplink-downlink configuration changes, whether the use of the first resource changes or not, the network device reallocates a resource for the first information, that is, the network device sends the second scheduling information of the first information, and correspondingly, the terminal device receives the second scheduling information.

In this case, the first resource and the second resource may be the same or different. The network device can determine the second resource based on an actual case. If both the first resource and the second resource are time-frequency resources, that the first resource is different from the second resource may include: The first resource and the second resource have different time domain resources and the same frequency domain resource, the first resource and the second resource have the same time domain resource and different frequency domain resources, or the first resource and the second resource have different time domain resources and different frequency domain resources.

240: The terminal device transmits the first information with the network device on the second resource, and correspondingly, the network device transmits the first information with the terminal device on the second resource.

In the embodiments of this application, in a case in which the network device determines the first resource used to transmit the first information, the network device can still dynamically adjust the uplink-downlink configuration based on an actual case, so that flexibility of information transmission between the network device and the terminal device can be improved. Further, in a case in which the uplink-downlink configuration changes, the terminal device redetermines the second resource used to transmit the first information, so that the first information can be correctly transmitted. In other words, the method according to the embodiments of this application can not only improve the flexibility of the information transmission, but also enable information to be correctly transmitted, and the method has relatively good flexibility and applicability.

Optionally, when transmitting the first information, the terminal device needs to obtain not only the second resource but also a transmission parameter used to transmit the first information, and the transmission parameter may include at least one of parameters used to transmit the first information, other than the second resource.

For example, assuming that the second resource is the second time unit, the transmission parameter may include a parameter such as a frequency domain index and a modulation coding mode.

For another example, assuming that the second resource is the time-frequency resource, the transmission parameter may include a parameter such as a modulation coding mode.

In other words, 240 may include: transmitting, by the terminal device based on the transmission parameter, the first information with the network device on the second resource.

The transmission parameter may include one of the following two types.

(1) The transmission parameter is a preset parameter used to transmit, by the network device and the terminal device, the first information on the first resource. In other words, the transmission parameter is a parameter that is determined by the network device and that is used to transmit, by the network device and the terminal device, the first information on the first resource. For ease of description, the transmission parameter may be denoted as a first transmission parameter. That is, the first transmission parameter is a transmission parameter configured by the network device for the first information before the uplink-downlink configuration changes.

In other words, the second scheduling information may include only some of parameters used to schedule the first information, and the terminal device may transmit the first information by using both the first scheduling information and the second scheduling information. The method helps to reduce an overhead of transmitting the first information. Optionally, the terminal device can obtain the first transmission parameter by receiving the first scheduling information.

(2) The transmission parameter is a parameter that is determined by the network device and that is used to transmit, by the network device and the terminal device, the first information on the second resource. For ease of description, the transmission parameter may be denoted as a second transmission parameter.

In other words, the network device reconfigures, in the second uplink-downlink configuration, the second transmission parameter for the first information. Optionally, the terminal device can obtain the second transmission parameter by receiving the second scheduling information. That is, the second scheduling information is further configured to indicate the second transmission parameter, and the second scheduling information may be full information used to schedule the first information.

It can be seen from the foregoing description that the first resource and the second resource may be time domain resources or time-frequency resources. If the first resource is the first time unit, the second resource is the second time unit, and the first information is first feedback information used to indicate whether first data is correctly received, as an optional example, the method 200 may further include: determining, by the network device, a second resource index based on a first resource index and a first index offset, where the second resource index satisfies the following formula:

$$n = n' + n_{offset}, \text{ where}$$

n' is the first resource index, the first resource index is an index of a resource used to transmit the first feedback information in a third resource, a time domain resource of the third resource is the first time unit, n is the second resource index, the second resource index is an index of a resource used to transmit the first feedback information in a fourth resource, a time domain resource of the fourth resource is the second time unit, and $n_{offset}$ is the first index offset.

As an optional example, the first resource index is specifically an index of a time-frequency resource used to transmit the first feedback information in the third resource, and the second resource index is specifically an index of a time-frequency resource used to transmit the first feedback information in the fourth resource.

As another optional example, the first resource index is specifically an index of a frequency domain resource used to transmit the first feedback information in the third resource, and the second resource index is specifically an index of a frequency domain resource used to transmit the first feedback information in the fourth resource.

Optional, the first direction transmission is the downlink transmission, the first resource index is specifically a resource index of a PHICH resource used to send, by the network device, the first feedback information in the third resource, and the second resource index is specifically a resource index of a PHICH resource used to send, by the network device, the first feedback information in the fourth resource.

Optionally, the resource index of the PHICH resource may include a group index of the PHICH resource, and the terminal device can determine the first resource index by using a method based on an existing standard.

For example, the terminal device can determine the first resource index based on the following formula:

$$n' = (I_{PRB\_RA}^{lowest\_index} + n_{DRMS}) \bmod N_{PHICH}^{group} + I_{PHICH} N_{PHICH}^{group} \quad (1), \text{ where}$$

$I_{PRB\_RA}^{lowest\_index}$ is an index of a lowest physical resource block PRB among PRBs of a physical uplink shared channel PUSCH used to transmit the first uplink data, $n_{DMRS}$ is a cyclic shift parameter of a demodulation reference signal DMRS, $(\bullet) \bmod (\bullet)$ is a mod function, $N_{PHICH}^{group}$ is a quantity of PHICH groups included in the third resource, $I_{PHICH}$ has a value of 0 or 1, $I_{PHICH}^{REMAP}$ is greater than 0, and $N_{PHICH}^{REMAP}$ is greater than 0. For detailed description of each parameter in the formula (1), refer to the related description of determining the group index of the PHICH resource in the existing standard (for example, a 3GPP standard).

As an optional example, based on the formula (1), the second resource index may satisfy a formula:

$$n = (I_{PRB\_RA}^{lowest\_index} + n_{DRMS}) \bmod N_{PHICH}^{group} + (I_{PHICH} + I_{PHICH}^{REMAP}) N_{PHICH}^{group} \quad (1), \text{ where}$$

$I_{PHICH}^{REMAP}$ is a first offset parameter, the first offset parameter is used to determine the first index offset, and the first index offset $n_{offset} = I_{PHICH}^{REMAP} N_{PHICH}^{group}$.

As another optional example, based on the formula (1), the second resource index may satisfy a formula:

$$n = (I_{PRB\_RA}^{lowest\_index} + n_{DRMS}) \bmod N_{PHICH}^{group} + I_{PHICH} N_{PHICH}^{group} + N_{PHICH}^{REMAP} \quad (3), \text{ where}$$

the first index offset $n_{offset} = N_{PHICH}^{REMAP}$.

Optional, the first direction transmission is the uplink transmission, the first resource index is specifically a resource index of a PUCCH resource used to send, by the terminal device, the first feedback information in the third resource, and the second resource index is specifically a resource index of a PUCCH resource used to send, by the terminal device, the first feedback information in the fourth resource.

Optionally, the terminal device can determine the first resource index by using a method based on an existing standard.

For example, the terminal device can determine the first resource index based on the following formula:

$$n' = (M - m - 1) \times N_p + m \times N_{p+1} + n_{CCE} + N_{PUCCH}^{(1)} \quad (4), \text{ where}$$

$N_{PUCCH}^{(1)}$ is configured to the terminal device by the network device through higher layer signaling, $n_{CCE}$ is an index of a first control channel element CCE used to transmit a corresponding downlink control channel PDCCH in a subframe $n - k_m$, $N_{PUCCH}^{(1)}$ is configured by the network device, $N_p$ is a total quantity of CCEs of p symbols in the PDCCH, and $N_{p+1}$ is a total quantity of CCEs of p+1 symbols in the PDCCH. For detailed descriptions of each parameter in the formula (1), refer to the related description of determining the resource index of the PDCCH resource in the existing standard (for example, a 3GPP standard).

As an optional example, based on the formula (4), the second resource index may satisfy a formula:

$$n = (M - m - 1) \times N_p + m \times N_{p+1} + n_{CCE} + N_{PUCCH}^{(1)} + I_{PUCCH}^{REMAP} N_{PUCCH}^{(1)} \quad (5), \text{ where}$$

$I_{PUCCH}^{REMAP}$ is a first offset parameter, the first offset parameter is used to determine the first index offset, and the first index offset $n_{offset} = I_{PUCCH}^{REMAP} N_{PUCCH}^{(1)}$.

As another optional example, based on the formula (4), the second resource index may satisfy a formula:

$$n = (M - m - 1) \times N_p + m \times N_{p+1} + n_{CCE} + N_{PUCCH}^{(1)} + N_{PUCCH}^{(1)} + N_{PUCCH}^{REMAP} \quad (6), \text{ where}$$

the first index offset $n_{offset} = N_{PUCCH}^{REMAP}$.

Specifically, if the network device sends, directly based on the first resource index, the first information on the fourth resource, a collision may occur between transmission of the first information and second information. The second information is feedback information transmitted through the fourth resource before the first time unit is changed from being used for the first direction transmission to being used for the second direction transmission.

Based on this, the first index offset exists between the first resource index and the second resource index. The first index offset may have a value greater than or equal to 0.

For example, assuming that the fourth resource is not used to transmit the feedback information before the first time unit is changed from being used for the first direction transmission to being used for the second direction transmission, the first index offset may be equal to 0.

For another example, assuming that the fourth resource is further used to transmit the second information before the first time unit is changed from being used for the first direction transmission to being used for the second direction transmission, the first index offset is greater than 0, to reduce a probability of the collision between the transmission of the first information and the second information.

Further, the first index offset may satisfy:

$$n_{offset} \geq n_{total}, \text{ where}$$

$n_{total}$ is a size of a resource used to transmit feedback information (the feedback information is another feedback information other than the first information) included in the fourth resource before the first time unit is changed from being used for the first direction transmission to being used for the second direction transmission.

The method helps to reduce the probability of the collision between the transmission of the first information and the second information.

The terminal device can determine the first index offset in a plurality of manners.

As an optional example, the terminal device determines the first index offset based on an index of the second time unit, the second uplink-downlink configuration and a mapping table, where the mapping table records a correspondence among an index of a time unit, an uplink-downlink configuration and an index offset, or the mapping table records a correspondence among an index of a time unit, an uplink-downlink configuration and an offset parameter, where the offset parameter is used to determine an index offset. Correspondingly, the network device may determine the first index offset in the same manner.

Table 4 is an example of the mapping table. The time unit is a subframe, the uplink-downlink configuration is a TDD frame configuration, and the mapping table records a correspondence of an index of a subframe, a TDD frame configuration and an offset parameter.

TABLE 4

| TDD frame configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | | | | 2 | 1 | | | |
| 1 | 0 | 1 | | | 1 | 0 | 1 | | | 1 |
| 2 | 0 | 0 | | 1 | 0 | 0 | 0 | | 1 | 0 |
| 3 | 1 | 0 | | | | 0 | 0 | 0 | 1 | 1 |
| 4 | 0 | 0 | | | 0 | 0 | 0 | 0 | 1 | 1 |
| 5 | 0 | 0 | | 0 | 0 | 0 | 0 | 0 | 1 | 0 |
| 6 | 1 | 1 | | | | 1 | 1 | | | 1 |

It is assumed that the second uplink-downlink configuration is a TDD frame configuration 0 and the first information is downlink feedback information of the first uplink data. According to table 1, in the first uplink-downlink configuration, the first information may be transmitted through a subframe 0 or 5 when the first uplink-downlink configuration is the TDD frame configuration 0. Before the network device and the terminal device transmit the first information, the uplink-downlink configuration changes from the first uplink-downlink configuration to the second uplink-downlink configuration (that is, the second uplink-downlink configuration is the TDD frame configuration 0). It can be seen from table 4 that the offset parameter is 2. The terminal device can determine the first offset based on the offset parameter, and further determine the second resource index.

As another optional example, the terminal device may obtain the first index offset by receiving offset information from the network device, where the offset information is used to indicate the first index offset.

Specifically, the network device may determine the first index offset (based on a transmission case), determine the offset information based on the first index offset, and send the offset information, so that the terminal device obtains the first index offset.

It should be understood that the offset information can explicitly or implicitly indicate the first index offset, and for detailed description, refer to the foregoing related description. For brevity, details are not described herein again.

In this embodiment of this application, when the uplink-downlink configuration changes, the first information originally transmitted through the first resource needs to be transmitted through the second resource, and third information originally transmitted through a fifth resource also needs to be transmitted through the second resource. In this case, a resource offset (a first resource offset) corresponding to the first information is different from a resource offset (a second resource offset) corresponding to the third information.

For example, the first index offset is $n_{offset(1)}$, and the second resource offset $n_{offset(2)}$ may be a maximum resource index corresponding to a resource used to transmit the first information. In other words, the network device may determine, based on the first index offset, a time-frequency resource used to transmit the first information, and the network device may determine, based on the time-frequency resource used to transmit the first information, an index offset corresponding to the third information.

It should be understood that the related description of the foregoing manners and cases is also applicable to the network device. For a specific operation of the network device in this embodiment of this application, refer to the foregoing specific operation of the terminal device without contradiction. For example, for a process in which the network device determines the second resource, refer to the foregoing process in which the terminal device determines the second resource. For another example, for a process in which the network device determines the second resource index offset, refer to the foregoing process in which the terminal device determines the second resource index offset.

Optionally, 240 may include: transmitting, by the terminal device, the first information with the network device on a time-frequency resource corresponding to the second index offset, and correspondingly, transmitting, by the network device, the first information with the terminal device on the time-frequency resource corresponding to the second index offset.

An information transmission method according to this embodiment of this application is described above with reference to FIG. 2 to FIG. 6, and a device according to the embodiments of this application is described below with reference to FIG. 7 to FIG. 10.

Figure 7:
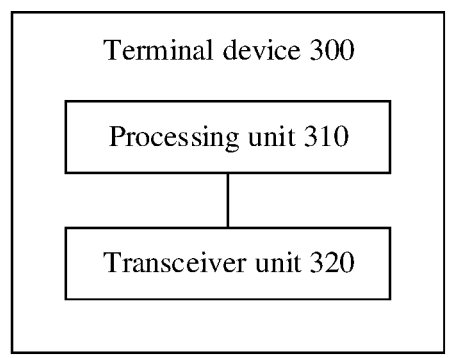
FIG. 7 is a schematic block diagram of an example of a terminal device according to an embodiment of this application.

FIG. 7 is a schematic block diagram of an example of a terminal device according to an embodiment of this application. As shown in FIG. 7, a terminal device 300 includes: a processing unit 310, configured to determine, when an uplink-downlink configuration between the device and a network device is a first uplink-downlink configuration, a first resource used to transmit first information; and a transceiver unit 320, configured to receive indication information from the network device, where the indication information is used to indicate that the uplink-downlink configuration is a second uplink-downlink configuration, where the processing unit 310 is further configured to determine, based on the indication information, a second resource used to transmit the first information; and the transceiver unit 320 is further configured to transmit the first information with the network device on the second resource.

Optionally, the transceiver unit 320 is further configured to receive first scheduling information of the first information from the network device, where the first scheduling information is used to indicate the first resource; and the processing unit 310 is specifically configured to determine the first resource based on the first scheduling information.

Optionally, the first resource is used for first direction transmission in the first uplink-downlink configuration; and the first resource is used for second direction transmission and the second resource is used for the first direction transmission in the second uplink-downlink configuration.

Optionally, the first resource is a first time unit, and the second resource is the first time unit that is used for the first direction transmission and that follows the first time unit in the second uplink-downlink configuration; or a time domain resource of the first resource is a first time unit, and a time domain resource of the second resource is the first time unit that is used for the first direction transmission and that follows the first time unit in the second uplink-downlink configuration.

Optionally, when receiving the indication information from the network device, or after receiving the indication information from the network device, the transceiver unit 320 is further configured to receive second scheduling information of the first information from the network device, where the second scheduling information is used to indicate the second resource; and the processing unit 310 is specifically configured to determine the second resource based on the indication information and the second scheduling information.

Optionally, the first information is first feedback information used to indicate whether first data is correctly received, the first resource is the first time unit, the second resource is a second time unit, and the processing unit 310 is further configured to determine a second resource index based on a first resource index and a first index offset, where the second resource index satisfies the following formula:

$$n=n'+n_{offset}, \text{ where}$$

n' is the first resource index, the first resource index is an index of a resource used to transmit the first feedback information in a third resource, a time domain resource of the third resource is the first time unit, n is the second resource index, the second resource index is an index of a resource used to transmit the first feedback information in a fourth resource, a time domain resource of the fourth resource is the second time unit, and $n_{offset}$ is the first index offset; and the transceiver unit 320 is specifically configured to transmit the first information with the network device on a time-frequency resource corresponding to the second index offset.

Optionally, the processing unit 310 is further configured to determine the first index offset based on an index of the second time unit, the second uplink-downlink configuration and a mapping table, where the mapping table records a correspondence among an index of a time unit, an uplink-downlink configuration and an index offset, or the mapping table records a correspondence among an index of a time unit, an uplink-downlink configuration and an offset parameter, where the offset parameter is used to determine an index offset; or the processing unit 310 is further configured to determine the first index offset based on offset information received by the transceiver unit 320 from the network device, where the offset information is used to indicate the first index offset.

It should be understood that each unit in the terminal device 300 according to this embodiment of this application and other operations or functions described above are each used to implement a corresponding procedure performed by the terminal device in the method 200 according to the embodiments of this application. For brevity, details are not described herein again.

Figure 8:
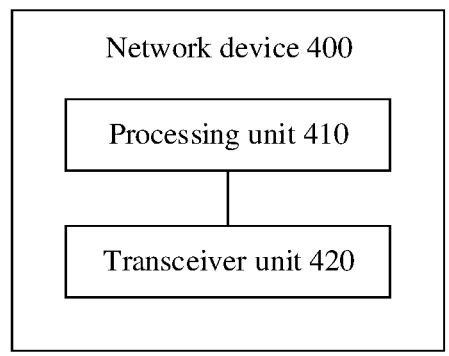
FIG. 8 is a schematic block diagram of an example of a network device according to an embodiment of this application.

FIG. 8 is a schematic block diagram of an example of a network device according to an embodiment of this application. As shown in FIG. 8, a network device 400 includes: a processing unit 410, configured to determine, by the network device when an uplink-downlink configuration between the device and a terminal device is a first uplink-downlink configuration, a first resource used to transmit first information; and a transceiver unit 420, configured to send indication information after the processing unit 410 determines that the uplink-downlink configuration between the device and the terminal device is a second uplink-downlink configuration, where the indication information is used to indicate that the uplink-downlink configuration is the second uplink-downlink configuration, where the processing unit 410 is further configured to determine, based on the second uplink-downlink configuration, a second resource used to transmit the first information; and the transceiver unit 420 is further configured to transmit the first information with the terminal device on the second resource.

Optionally, before sending the indication information, the transceiver unit 420 is further configured to send first scheduling information of the first information to the terminal device, where the first scheduling information is used to indicate the first resource.

Optionally, the first resource is used for first direction transmission in the first uplink-downlink configuration; and the first resource is used for second direction transmission and the second resource is used for the first direction transmission in the second uplink-downlink configuration.

Optionally, the first resource is a first time unit, and the second resource is the first time unit that is used for the first direction transmission and that follows the first time unit in the second uplink-downlink configuration; or a time domain resource of the first resource is a first time unit, and a time domain resource of the second resource is the first time unit that is used for the first direction transmission and that follows the first time unit in the second uplink-downlink configuration.

Optionally, the transceiver unit 420 is further configured to send, when sending the indication information, or after sending the indication information, second scheduling information of the first information to the terminal device, where the second scheduling information is used to indicate the second resource.

Optionally, the first information is first feedback information used to indicate whether first data is correctly received, the first resource is the first time unit, the second resource is a second time unit, and the processing unit 410 is further configured to determine, a second resource index based on a first resource index and a first index offset, where the second resource index satisfies the following formula:

$$n=n'+n_{offset}, \text{ where}$$

n' is the first resource index, the first resource index is an index of a resource used to transmit the first feedback information in a third resource, a time domain resource of the third resource is the first time unit, n is the second resource index, the second resource index is an index of a resource used to transmit the first feedback information in a fourth resource, a time domain resource of the fourth resource is the second time unit, and $n_{offset}$ is the first index offset; and the transceiver unit 420 is specifically configured to transmit the first information with the terminal device on a time-frequency resource corresponding to the second index offset.

Optionally, the processing unit 410 is further configured to determine the first index offset based on an index of the second time unit, the second uplink-downlink configuration and a mapping table, where the mapping table records a correspondence among an index of a time unit, an uplink-downlink configuration and an index offset, or the mapping table records a correspondence among an index of a time unit, an uplink-downlink configuration and an offset parameter, where the offset parameter is used to determine an index offset; or the transceiver unit 420 is further configured to send offset information determined by the processing unit 410 based on the first index offset, where the offset information is used to indicate the first index offset.

It should be understood that each unit in the network device 400 according to this embodiment of this application and other operations or functions described above are each used to implement a corresponding procedure performed by the network device in the method 200 according to the embodiment of this application. For brevity, details are not described herein again.

Figure 9:
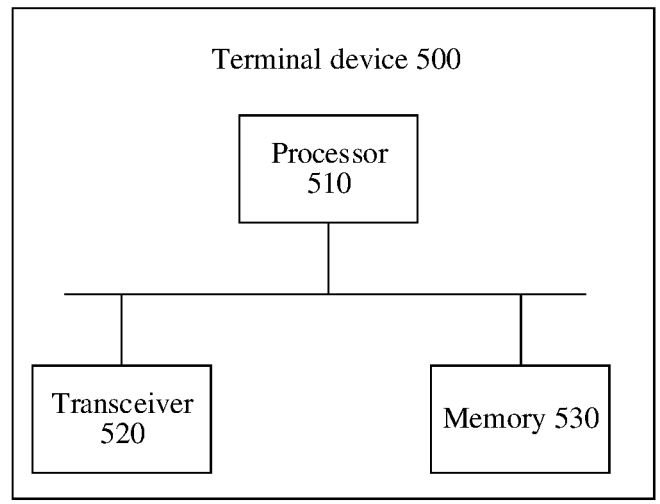
FIG. 9 is a schematic block diagram of another example of a terminal device according to an embodiment of this application.

FIG. 9 is a schematic block diagram of another example of a terminal device according to an embodiment of this application. As shown in FIG. 9, the terminal device 500 includes a processor 510 and a transceiver 520. The processor 510 is configured to support the terminal device to perform a corresponding function of the terminal device in the foregoing method. Optionally, the terminal device 500 may further include a memory 530. The memory 530 is configured to be coupled to the processor 510, to store a necessary program instruction and data for the terminal device 500. The processor 510 is specifically configured to execute the instruction stored in the memory 530. When the instruction is executed, the terminal device performs the method performed by the terminal device in the foregoing method.

It should be noted that the terminal device 300 shown in FIG. 7 may be implemented through the terminal device 500 shown in FIG. 9. For example, the processing unit 310 shown in FIG. 7 may be implemented by the processor 510 (that is, the processing unit 310 may be the processor 510), and the transceiver unit 320 may be implemented by the transceiver 520 (that is, the transceiver unit 320 may be the transceiver 520).

Figure 10:
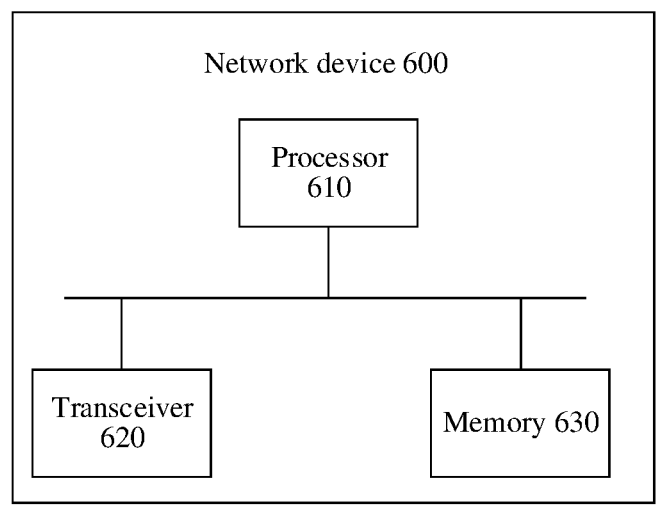
FIG. 10 is a schematic block diagram of another example of a network device according to an embodiment of this application.

FIG. 10 is a schematic block diagram of another example of a network device according to an embodiment of this application. As shown in FIG. 10, a network device 600 includes a processor 610 and a transceiver 620. The processor 610 is configured to support the network device to perform a corresponding function of the network device in the foregoing methods. Optionally, the network device may further include a memory 630. The memory 630 is configured to be coupled to the processor 610, to store a necessary program instruction and data for the network device. The processor 610 is specifically configured to execute the instruction stored in the memory 630. When the instruction is executed, the network device performs the method performed by the network device in the foregoing method.

It should be noted that the network device 400 shown in FIG. 8 may be implemented through the network device 600 shown in FIG. 10. For example, the processing unit 410 shown in FIG. 8 may be implemented by the processor 610 (that is, the processing unit 410 may be the processor 610), and the transceiver unit 420 may be implemented by the transceiver 620 (that is, the transceiver unit 420 may be the transceiver 620).

It should be noted that this application describes the method and the device of the embodiments of this application by using a terminal device and a network device as an example. It should be understood that the method of the embodiments of this application may further be implemented by two baseband chips. A first baseband chip of the two baseband chips is configured to implement related operations of the terminal device in the embodiments of this application, and a second baseband chip of the two baseband chips is configured to implement related operations of the network device in the embodiments of this application.

It should also be noted that an input/output circuit of the first baseband chip can be configured to implement the foregoing related operations of the transceiver of the terminal device, and an input/output circuit of the second baseband chip can be configured to implement the foregoing related operations of the transceiver of the network device.

It should be understood that, the processor in the embodiments of this application may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like.

It may further be understood that the memory in the embodiments of this application may be a volatile memory or a non-volatile memory, or may include a volatile memory and a non-volatile memory. The nonvolatile memory may be a read-only memory (ROM), a programmable ROM (PROM), an erasable PROM (EPROM), an electrically EPROM (EEPROM), or a flash memory. The volatile memory may be a random access memory (RAM), used as an external cache. Through example but not limitative description, many forms of random access memories (RAM) may be used, for example, a static RAM (SRAM), a DRAM, a synchronous DRAM (SDRAM), a double data rate SDRAM (DDR SDRAM), an enhanced SDRAM (ES-DRAM), a synchlink DRAM (synchlink DRAM, SLDRAM), and a direct rambus RAM (DR RAM).

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk or a magnetic tape), an optical medium (for example, a digital versatile disc (digital versatile disc, DVD)), or a semiconductor medium. The semiconductor medium may be a solid state drive.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
determining, by a terminal device when an uplink-downlink configuration between the terminal device and a network device is a first uplink-downlink configuration, a first resource to use to transmit first information;
before the first information is transmitted, receiving, by the terminal device, indication information from the network device, wherein the indication information indicates that the uplink-downlink configuration between the terminal device and the network device has changed from the first uplink-downlink configuration to a second uplink-downlink configuration;
when the terminal device receives the indication information from the network device, or after the terminal device receives the indication information from the network device, receiving, by the terminal device, second scheduling information of the first information from the network device, wherein the second scheduling information indicates a second resource;
determining, by the terminal device based on the indication information and the second scheduling information, the second resource to use to transmit the first information; and
transmitting, by the terminal device, the first information with the network device using the second resource.

2. The method according to claim 1, wherein determining the first resource to use to transmit the first information comprises:
receiving, by the terminal device, first scheduling information of the first information from the network device, wherein the first scheduling information indicates the first resource; and
determining, by the terminal device, the first resource based on the first scheduling information.

3. The method according to claim 1, wherein:
the first resource is used for first direction transmission in the first uplink-downlink configuration; and
the first resource is used for second direction transmission and the second resource is used for the first direction transmission in the second uplink-downlink configuration.

4. The method according to claim 3, wherein:
the first resource is a first time unit, and the second resource is the first time unit, and the second resource follows the first resource in the second uplink-downlink configuration; or
a time domain resource of the first resource is a first time unit, a time domain resource of the second resource is the first time unit, and the time domain resource of the second resource follows the time domain resource of the first resource in the second uplink-downlink configuration.

5. A device, comprising:
a processor;
a non-transitory computer-readable storage medium storing a program to be executed by the processor, the program including instructions for:
determining, when an uplink-downlink configuration between the device and a network device is a first uplink-downlink configuration, a first resource to use to transmit first information, wherein the first information is first feedback information indicating whether first data is correctly received, and the first resource is a first time unit; and a transceiver, configured to:
  before the first information is transmitted, receive indication information from the network device, wherein the indication information indicates that the uplink-downlink configuration between the device and the network device has changed from the first uplink-downlink configuration to a second uplink-downlink configuration; and
wherein the program further includes instructions for:
  determining a second resource index based on a first resource index and a first index offset, wherein the second resource index satisfies a relation of $n=n+n_{offset}$, wherein n is the first resource index, the first resource index is of a resource used to transmit the first feedback information in a third resource, a time domain resource of the third resource is the first time unit, n is the second resource index, the second resource index is of a resource used to transmit the first feedback information in a fourth resource, a time domain resource of the fourth resource is a second time unit, and $n_{offset}$ is the first index offset;
  determining, based on the indication information received by the transceiver, the second resource to use to transmit the first information, wherein the second resource is the second time unit; and
wherein the transceiver is further configured to:
  transmit or receive the first information using the second resource on a time-frequency resource corresponding to the second resource index.

6. The device according to claim 5, wherein:
the transceiver is further configured to:
  receive first scheduling information of the first information from the network device, wherein the first scheduling information indicates the first resource; and
the program includes instructions for determining the first resource based on the first scheduling information.

7. The device according to claim 5, wherein:
the first resource is used for first direction transmission in the first uplink-downlink configuration; and
the first resource is used for second direction transmission and the second resource is used for the first direction transmission in the second uplink-downlink configuration.

8. The device according to claim 7, wherein the program further includes instructions for:
  determining the first index offset based on an index of the second time unit, the second uplink-downlink configuration, and a mapping table, wherein the mapping table records a correspondence among the index of the second time unit, the second uplink-downlink configuration and the first index offset, or the mapping table records a correspondence among the index of the second time unit, the second uplink-downlink configuration, and an offset parameter, wherein the offset parameter is used to determine the first index offset.

9. The device according to claim 7, wherein the program further includes instructions for:
  determining the first index offset based on offset information received by the transceiver from the network device, wherein the offset information indicates the first index offset.

10. A device, comprising:
a processor; and
a non-transitory computer-readable storage medium storing a program to be executed by the processor, the program including instructions for:
  determining, when an uplink-downlink configuration between the device and a terminal device is a first uplink-downlink configuration, a first resource to use to transmit first information; and
a transceiver, configured to, before the first information is transmitted, send indication information after determining that the uplink-downlink configuration between the device and the terminal device has changed from the first uplink-downlink configuration to a second uplink-downlink configuration, wherein the indication information indicates that the uplink-downlink configuration has changed to the second uplink-downlink configuration;
wherein the program further includes instructions for determining, based on the second uplink-downlink configuration, a second resource to use to transmit the first information; and
wherein the transceiver is further configured to:
  when sending the indication information, or after sending the indication information, send second scheduling information of the first information, wherein the second scheduling information indicates the second resource; and
  transmit or receive the first information on the second resource.

11. The device according to claim 10, wherein the transceiver is further configured to:
before sending the indication information, send first scheduling information of the first information to the terminal device, wherein the first scheduling information indicates the first resource.

12. The device according to claim 10, wherein:
the first resource is used for first direction transmission in the first uplink-downlink configuration; and
the first resource is used for second direction transmission and the second resource is used for the first direction transmission in the second uplink-downlink configuration.

* * * * *